(12) United States Patent
Trenkamp et al.

(10) Patent No.: US 11,073,228 B2
(45) Date of Patent: Jul. 27, 2021

(54) DIAPHRAGM VALVE

(71) Applicant: Buerkert Werke GmbH & Co. KG, Ingelfingen (DE)

(72) Inventors: Daniel Trenkamp, Ingelfingen (DE); Jan Westermann, Ingelfingen (DE); Franziska Maier, Ingelfingen (DE); Peter Krippner, Ingelfingen (DE)

(73) Assignee: BUERKERT WERKE GMBH & CO. KG, Ingelfingen (DE)

( * ) Notice: Subject to any disclaimer, the term of this patent is extended or adjusted under 35 U.S.C. 154(b) by 0 days.

(21) Appl. No.: 16/925,867

(22) Filed: Jul. 10, 2020

(65) Prior Publication Data
US 2021/0010613 A1    Jan. 14, 2021

(30) Foreign Application Priority Data
Jul. 10, 2019   (DE) .......................... 102019118721.4

(51) Int. Cl.
*F16K 37/00* (2006.01)
*F16K 27/02* (2006.01)
*F16K 7/14* (2006.01)

(52) U.S. Cl.
CPC ............ *F16K 37/0025* (2013.01); *F16K 7/14* (2013.01); *F16K 27/0236* (2013.01)

(58) Field of Classification Search
CPC ..... F16K 7/14; F16K 27/0236; F16K 37/0025
See application file for complete search history.

(56) References Cited

U.S. PATENT DOCUMENTS

| 9,542,633 | B2* | 1/2017 | Mueller | ..................... F16J 3/02 |
| 2018/0356843 | A1* | 12/2018 | Stier | .................. F16K 27/0236 |
| 2019/0346063 | A1* | 11/2019 | Lebonte | ............. F16K 37/0075 |

* cited by examiner

*Primary Examiner* — Eric Keasel
(74) *Attorney, Agent, or Firm* — McNees Wallace & Nurick LLC

(57) ABSTRACT

A diaphragm valve having a movable diaphragm (20) configured as a closure element has a valve housing (6) and an actuator (8), the diaphragm (20) being clamped between a flange (18) of the valve housing and a base (10) of the actuator (8) and being provided with a first identification means (32) in which data which are adapted to be read out wirelessly are stored. A further identification means (50, 56) is also fastened to the flange (18) and/or the base (10). The read-out surfaces of the further identification means (50, 56) are substantially at right angles to the read-out surface of the identification means (32) on the diaphragm (20).

12 Claims, 1 Drawing Sheet

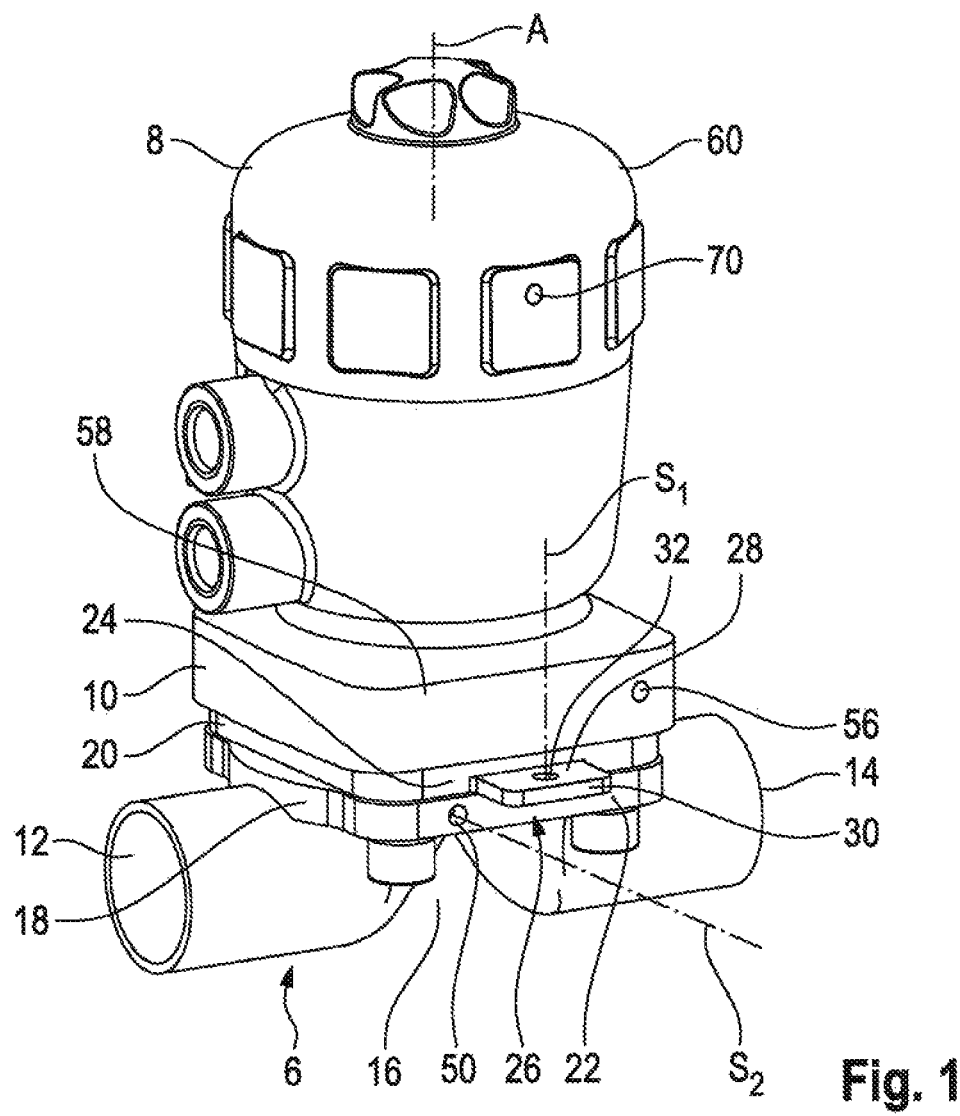
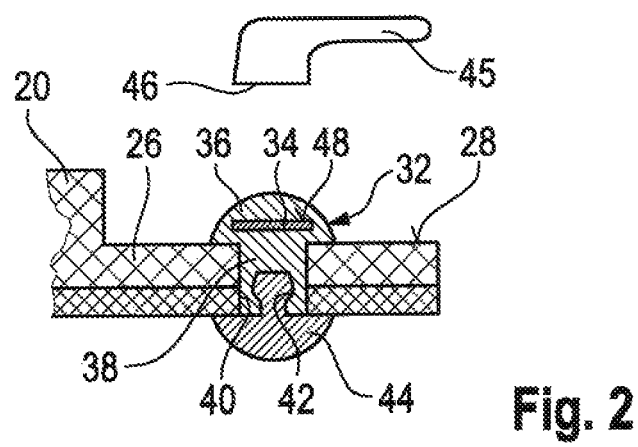

DIAPHRAGM VALVE

The invention relates to a diaphragm valve having a movable diaphragm configured as a closure element, a valve housing and an actuator, the diaphragm being clamped between a flange of the valve housing and a base of the actuator and being provided with a first identification means in which data are stored which are adapted to be read out wirelessly.

It is now often desired that valves are provided with identification means, in particular RFID chips, which contain data about the valve, for example the material of the housing, the manufacturing number, the date of manufacture and/or the type number as well as corresponding information about the diaphragm. These identification means have stored valve data which are adapted to be read out wirelessly. The data do not have to be directly stored as such in the identification means so as to be adapted to be read out, rather, codes can be stored in the identification means which, after being read out, are then assigned to data which are stored in a data memory and represent the aforementioned information about the valve, etc.

If more than one identification means is provided on a valve, it must be avoided that during readout, not the identification means actually to be read out but an adjacent identification means is read out. For this reason, it is desirable to position the various identification means as far away from each other as possible on different parts or on the same part. However, this can make accessibility more difficult, as the valves are mounted into systems or assemblies, and not every side of a diaphragm valve is always optimally accessible.

Therefore, the object of the invention is to improve a diaphragm valve such that the identification means thereof can be read out easily and quickly.

This object is achieved by a diaphragm valve of the type initially mentioned, in which the first identification means has a read-out surface on which a read-out device can be positioned in order to read out the data from the first identification means, and wherein additionally a further identification means is provided on the flange, in which data which are adapted to be read out wirelessly are stored, and/or a further identification means is provided at the base, in which data which are adapted to be read out wirelessly are stored, and wherein the further identification means has/have a read-out surface extending substantially perpendicularly to the read-out surface of the first identification means. A read-out surface is the surface of the identification means to which the readout device must be held directly or in a parallel manner to read out the data optimally. Usually, the identification means, for example RFID chips, cannot be read out from all sides or at least not equally well read out from all sides. There is a preferred plane, the read-out surface, parallel to which the read-out device can read out the identification means in the most optimal way. In the case of an RFID chip, the read-out surface is parallel to the flat coil which is arranged in a plate-shaped manner. Due to the identification means arranged at right angles to each other, there is no risk that if the read-out device is not held exactly at or above a read-out surface, another identification means is read out inadvertently. This is effectively prevented by the angled arrangement. It is thus possible, during the reading-out, to clearly assign the stored data to the respective part at which the read-out identification means is located. The entire system is therefore less susceptible to faults.

According to one embodiment of the invention, the diaphragm has a laterally outwardly protruding tab on which the first identification means is provided. This projecting tab ensures that the identification means is positioned away from the base and the flange and is easily accessible.

In addition, the tab is not exposed to mechanical stress like the remaining diaphragm, so that the identification means is protected by this positioning.

This tab may be configured in a plate-like, flat manner and more specifically have opposite flat sides, these flat sides being the largest sides of the tab in terms of surface. Furthermore, the tab has an envelope side which spaces the flat sides, which extends on three sides of the tab, for example. The read-out surface of the first identification means extends parallel to at least one of the flat sides. Within the meaning of the present invention, "parallel" also means that the respective read-out surface can run in the flat side itself. In the present case, this would be the case if the read-out surface of the first identification means merges into one of the flat sides without a step. The flat sides of the protruding tab can be reached very easily from the top or from the bottom, so that the read-out process can take place easily and safely.

According to one variant of the invention, the flange is also configured in a plate-like manner and has a peripheral side facing outwards, the read-out surface of the identification means on the flange extending parallel to the area of the peripheral side of the flange adjacent thereto, "adjacent area" being the area immediately adjacent to this identification means. Consequently, in contrast to the tab, the read-out surface here runs parallel to the peripheral side (or lies in the peripheral side), i.e. 90° to the read-out surface of the first identification means. Here, the read-out device is therefore aligned vertically for example in case of an upwardly projecting actuator for reading out the further identification means, whereas it must be held horizontally on the diaphragm when reading out the identification means.

The flange of many diaphragm valves is substantially quadrangular, wherein quadrangular does not necessarily mean that there are actually corners, as these corners are usually rounded. The diaphragm has a substantially identical shape, with side lengths that differ at most slightly from the side lengths of the flange. Accordingly, the flange has one or more flat sides along the peripheral side, the further identification means being located on the flat side, which is located on the same side of the valve as the tab on the diaphragm. The invention in this variant assumes that the diaphragm valve may be mounted in an system such that it is best accessible from one side, so that all or almost all of the identification means can be read out from this side. In the prior art, this meant that incorrect readings could occur, i.e. an incorrect assignment of the read-out process to the corresponding identification means because they are all very close to each other. However, according to the invention, this arrangement of a plurality of identification means on one side is unproblematic due to the alignment of the read-out surfaces to each other.

Circular cylindrical flange and diaphragm and base geometries are also known. The invention can be implemented there accordingly.

Optionally, the base can be configured substantially quadrangular or in a plate-like manner, similar to the flange before. The peripheral side of the base has four side faces, and the further identification means of the base is located on that side face, which is located on the same side of the valve as the tab on the diaphragm. The above-mentioned advantages of the arrangement of the further identification means of the flange also apply accordingly to the arrangement of the identification means on the base.

A further improvement of the read-out reliability may be achieved in that, seen in a lateral view on the flat side or the side face with the further identification means, the further identification means is/are positioned laterally offset to the first identification means. The distance between the identification means is thus increased.

The support of the identification means may be achieved such that they are each inserted into one receiving opening. Optionally, the respective receiving opening can be closed. Alternatively, the identification means is or are fastened in such a receiving opening without protruding into the receiving opening. For example, the identification means can be cast in a plastic support which protrudes into the receiving opening with a projection.

A variant of the invention provides that the identification means are RFID chips. Such identification means are very simple and cost-effective in manufacture and can store sufficient data. These RFID chips which are configured in a flat manner have a read-out surface parallel to the parallel flat sides.

The stored data themselves are, for example, data concerning the assigned component. If necessary, data concerning the assigned valve may also be stored. Such data include information or are wildcard characters for information as to manufacturing data, materials, manufacturing numbers, type numbers and the like. Especially when diaphragm valves are used in pharmaceutical or food processing plants, it is necessary that the parts or individual components are clearly assigned to the plant over the entire operating time of the corresponding diaphragm valve.

For example, the valve housing may have a hydroformed tube through which the fluid flows. The flange is fastened, for example welded or soldered to this tube. Such a valve housing is characterized by a thin wall, which makes it difficult to fasten an identification means. For this reason, the invention provides that the flange is used here for fastening the identification means.

The actuator can optionally have a cover part which includes an identification means in which data are stored which are adapted to be read out wirelessly. Such actuators having a cover part are used in particular for diaphragm or seat valves.

If a plurality of parts, which are arranged one on top of the other and are fastened to each other, are provided with identification means, the invention provides that they are each alternately aligned with respect to their read-out surfaces substantially perpendicularly to each other, so that parallel read-out surfaces are always interrupted by read-out surfaces which are arranged substantially perpendicularly to these aforementioned read-out surfaces.

Further features and advantages of the invention will become apparent from the description and drawings below to which reference is made and in which:

FIG. 1 shows a perspective view of a diaphragm valve according to the invention, and FIG. 2 shows a sectional view through a tab of the diaphragm of the diaphragm valve of FIG. 1.

FIG. 1 shows a diaphragm valve, comprising a valve housing 6 and an actuator 8, which has a base 10. The valve housing 6 has a fluid inlet 12 and an opposite fluid outlet 14.

This part of the valve housing 6 is created by a hydroformed tube. The valve seat not shown is formed on the inside of an indentation 16 made during the forming process.

The tube is open laterally to the valve seat. A plate-shaped flange 18 is welded onto this side. This flange 18 has a flat upper side on which a plate-like diaphragm 20 rests. The flange 18 is configured in a substantially quadrangular manner and has a peripheral side with four substantially flat sides, one of which bears the reference number 22. The side faces can merge into each other via rounded corners.

The diaphragm 20 is clamped between the flange 18 and the base 10.

A tab 26 which protrudes laterally outwards projects from the diaphragm 20, which is also configured in a quadrangular manner, on the side face 24 of the diaphragm 20 corresponding to the side face 22. This tab 26 is flat and, as already mentioned, plate-like and has two opposite flat sides 28, of which only the upper one can be seen in FIG. 1. The two flat sides 28 are spaced apart by an envelope side 30 extending on three sides.

As shown in FIG. 2, the tab 26 has an identification means 32 attached thereto. The identification means 32 contains an RFID chip 34 embedded in a plastic envelope 36. The plastic envelope 36 has a pin-shaped projection 38 which protrudes into a receiving opening 40 in the tab 26. An opening 42 having an undercut is formed in the pin-shaped projection 38, through which a latching part 44 can be inserted, which has a mushroom-shaped, complementary projection.

The latching part 44 and the identification means 32 are thus connected to each other by a closure which cannot be detached in a non-destructive manner, so that both parts are firmly attached to the tab 26.

The receiving opening 40 can protrude completely through the tab 26.

The RFID chip 34 is plate-shaped. In order to read it out, a reading device 45 must be held with its read head and a transmitter-receiver surface 46 such that it runs at a specific angle, usually parallel to the so-called read-out surface 48 of the identification means. This read-out surface 48 is the upper side of the RFID chip 34. In the embodiment shown, the read-out surface 48 runs parallel to the upper flat side 28 of flange 26.

Information about the diaphragm 20 such as the date of manufacture, the article number, the type number and the like is stored on the identification means 32, or more precisely on the RFID chip 34. The RFID chip 34 can also store a corresponding number or identification, which is assigned only once. Via a data record stored outside the identification means 32, all data stored there (specifically for the diaphragm, for example) can then be assigned to the individual number or identification read out.

Not only the diaphragm 20 carries an identification means 32 which constitutes the first identification means 32, but also the flange 18 carries such an identification means 50. This identification means is a so-called further identification means 50, which is shown in FIG. 1.

This identification means 50 also includes an RFID chip or is formed by such a chip.

The read-out surface of this further identification means 50 is parallel to the side surface 22, on which the identification means 50 is provided. The identification means 50 is here, for example, embedded in a pin, here a cylindrical pin. The end face of this pin runs parallel to the side face 22 and may slightly protrude from the latter in order to be able to feel the other identification means 50. The end face of the pin is the read-out surface.

As can be seen in FIG. 1, the read-out surfaces are substantially perpendicular to each other, or more precisely, planes in which the corresponding read-out surfaces are located. This is symbolized by the perpendiculars S1 and S2 of the corresponding read-out surfaces of the first identification means 32 and the second identification means 50.

In FIG. 1 it can also be seen that, when looking on the side face 22, i.e. in a lateral view, the identification means 32, 50 are laterally offset to each other. This means that the second identification means 50, with the appropriate alignment of the actuator 8 with its center axis A, is not located vertically directly above or below the first identification means 32, but, as already mentioned, laterally offset with respect thereto.

As an alternative or in addition to the identification means 50, the base 10 may also have a further identification means 56. Here too, the read-out surface is substantially perpendicular to the read-out surface 48 of the first identification means 32. The identification means 56 is also located on a side face 58, which is located on the same side of the valve as the tab 26 on the diaphragm 20.

As seen in a lateral view, the identification means 56 is located on the opposite (right) side to identification means 50 with respect to the identification means 32, in order to achieve the greatest possible distance between the identification means 50 and 56, the read-out surfaces of which lie in the same plane or in parallel planes to each other.

One or more identification means 70 may also be provided on the so-called cover 60 of the actuator.

As all the identification means 32, 50 and 56 and 70 are located on the same side of the valve, the reading-out process, which is carried out by the same reading device 45, is very fast and very reliable. The identification means 32, 50, 56 and 70 are supported in their respective parts by receiving openings and cannot be removed without destruction, so that no manipulation is possible and the identification means are permanently attached to their parts.

If the flange 18 is not configured in a quadrangular or polygonal manner but has a curved peripheral side, the read-out surface of the identification means 50 should be parallel to the immediately adjacent area of the peripheral side of the flange 18. This means that the user of the reading device 45 may be prepared for the fact that the read-out surface of the identification means 50 detected by the reading device does not extend angled to the peripheral side, but is located in the outer peripheral surface, i.e. the peripheral side, or is slightly offset inwards or outwards parallel to these sections. The user will therefore try to align the surface 46 parallel to the surface of the peripheral side in the area of the identification means 50.

The invention claimed is:

1. A diaphragm valve comprising a movable diaphragm configured as a closure element, a valve housing and an actuator, the diaphragm being clamped between a flange of the valve housing and a base of the actuator and being provided with a first identification device in which data are stored which are adapted to be read out wirelessly, wherein
the first identification device has a read-out surface at which a reading device is adapted to be positioned to read out data from the first identification device, wherein
additionally
at least one of a second identification device and a third identification device, wherein the second identification device is provided on the flange, in which data adapted to be read out wirelessly are stored,
wherein the third identification device is provided on the base, in which data adapted to be read out wirelessly are stored,
and wherein each second identification device and each third identification device has a read-out surface extending substantially perpendicularly to the read-out surface of the first identification device.

2. The diaphragm valve according to claim 1, wherein the diaphragm has a tab which projects laterally outwards and at which the first identification device is provided.

3. The diaphragm valve according to claim 2, wherein the tab is flat and has two opposite flat sides and an envelope side which spaces the flat sides apart from each other, wherein the read-out surface of the first identification device extends parallel to at least one of the flat sides.

4. The diaphragm valve according to claim 1, wherein the flange is a plate and has an outwardly facing peripheral side, wherein the read-out surface of the identification device on the flange extends parallel to the adjoining area of the peripheral side of the flange.

5. The diaphragm valve according to claim 4, wherein the diaphragm has a tab which projects laterally outwards and at which the first identification device is provided, and wherein the flange is substantially quadrangular and the peripheral side has at least one side face, wherein the further identification device is located on the side face and the latter adjoins the tab.

6. The diaphragm valve according to claim 5, wherein the tab is flat and has two opposite flat sides and an envelope side which spaces the flat sides apart from each other, wherein the read-out surface of the first identification device extends parallel to at least one of the flat sides, and wherein as seen in a lateral view on the flat side or the side face including the at least one of the second and third identification devices, the at least one of the second and third identification devices is positioned laterally offset with respect to the first identification device.

7. The diaphragm valve according to claim 1, wherein the diaphragm has a tab which projects laterally outwards and at which the first identification device is provided, and wherein the base is substantially quadrangular, wherein the peripheral side of the base has side faces and the third identification device of the base is located on that side face which is arranged on the same side of the diaphragm valve on which the tab is also arranged on the diaphragm.

8. The diaphragm valve according to claim 1, wherein at least one of the diaphragm, the flange and/or the base has a receiving opening for inserting one of the first, second and third identification devices.

9. The diaphragm valve according to claim 1, wherein the identification devices have or are RFID chips.

10. The diaphragm valve according to claim 1, wherein data concerning the diaphragm are stored in the first identification device, data concerning the flange are stored in the second identification device and data concerning the base are stored in the third identification device.

11. The diaphragm valve according to claim 1, wherein the valve housing has a hydroformed tube to which the flange is fastened.

12. The diaphragm valve according to claim 1, wherein the actuator has a cover which includes a fourth identification device in which data which are adapted to be read-out wirelessly are stored.

* * * * *